US012704683B2

(12) United States Patent
Born

(10) Patent No.: US 12,704,683 B2
(45) Date of Patent: Aug. 11, 2026

(54) OPTICAL SYSTEMS WITH MODULATED SURFACE RELIEF GRATINGS

(71) Applicant: Apple Inc., Cupertino, CA (US)

(72) Inventor: Brandon Born, Sunnyvale, CA (US)

(*) Notice: Subject to any disclaimer, the term of this patent is extended or adjusted under 35 U.S.C. 154(b) by 281 days.

(21) Appl. No.: 18/489,762

(22) Filed: Oct. 18, 2023

(65) Prior Publication Data

US 2024/0045147 A1 Feb. 8, 2024

Related U.S. Application Data

(63) Continuation of application No. PCT/US2022/027678, filed on May 4, 2022.

(60) Provisional application No. 63/185,198, filed on May 6, 2021.

(51) Int. Cl.
*G02B 6/34* (2006.01)
*G02B 6/26* (2006.01)

(52) U.S. Cl.
CPC ............... *G02B 6/34* (2013.01); *G02B 6/262* (2013.01)

(58) Field of Classification Search
CPC ........................ G02B 6/34; G02B 6/017–0172
See application file for complete search history.

(56) References Cited

U.S. PATENT DOCUMENTS

| | | | | |
|---|---|---|---|---|
| 8,160,411 | B2 | 4/2012 | Levola et al. | |
| 10,061,124 | B2 * | 8/2018 | Tervo | G02B 27/4205 |
| 10,823,894 | B2 | 11/2020 | Peroz et al. | |
| 10,935,730 | B1 | 3/2021 | Lou et al. | |
| 10,983,263 | B2 | 4/2021 | Kleinman et al. | |
| 11,086,059 | B2 * | 8/2021 | Schultz | G02B 5/18 |
| 11,460,609 | B2 | 10/2022 | Peroz et al. | |

(Continued)

FOREIGN PATENT DOCUMENTS

| | | | |
|---|---|---|---|
| CA | 3124289 | A1 | 10/2020 |
| CN | 109239842 | A | 1/2019 |

(Continued)

OTHER PUBLICATIONS

Bernard C. Kress et al., Waveguide combiners for mixed reality headsets: a nanophotonics design perspective, Nanophotonics, Oct. 7, 2020, pp. 41-74, vol. 10, No. 1, De Gruyter.

(Continued)

*Primary Examiner* — Rhonda S Peace
(74) *Attorney, Agent, or Firm* — Treyz Law Group, P.C.; Michael H. Lyons

(57) ABSTRACT

A display may include a waveguide and a surface relief grating (SRG) structure on the waveguide. The SRG structure may perform expand image light propagating in the waveguide. The SRG structure may also couple the expanded image light out of the waveguide and towards an eye box. The SRG structure may include at least first and second SRGs that expand the image light in opposite directions. The first SRG may couple the image light expanded by the second SRG out of the waveguide and the second SRG may couple the image light expanded by the first SRG out of the waveguide. Modulation functions may be used to vary the grating strengths of the SRGs in the SRG structure between brow and cheek regions of the SRG structure. Diffraction efficiency of the SRG structure may additionally or alternatively be varied between nasal and temple regions of the SRG structure.

20 Claims, 9 Drawing Sheets

(56) References Cited

U.S. PATENT DOCUMENTS

| | | | | |
|---|---|---|---|---|
| 12,379,537 | B1 * | 8/2025 | Hu | G02B 6/0036 |
| 2009/0129116 | A1 | 5/2009 | Kim et al. | |
| 2021/0072437 | A1 | 3/2021 | Singh et al. | |
| 2021/0191122 | A1 * | 6/2021 | Yaroshchuk | G02B 6/0076 |
| 2022/0128817 | A1 | 4/2022 | Singh et al. | |
| 2023/0333302 | A1 * | 10/2023 | Bhakta | G02B 27/0172 |
| 2024/0045147 | A1 * | 2/2024 | Born | G02B 27/4272 |
| 2024/0184117 | A1 * | 6/2024 | DeLapp | G02B 27/0172 |
| 2025/0093560 | A1 * | 3/2025 | Farrell | G02B 5/1857 |
| 2025/0362508 | A1 * | 11/2025 | Born | G02B 27/0172 |

FOREIGN PATENT DOCUMENTS

| | | | |
|---|---|---|---|
| CN | 111766707 | A | 10/2020 |
| EP | 2733517 | A1 | 5/2014 |
| KR | 20200110183 | A | 9/2020 |
| WO | 2020243111 | A1 | 12/2020 |

OTHER PUBLICATIONS

Jiasheng Xiao et al., Design of achromatic surface microstructure for near-eye display with diffractive waveguide, Optics Communications, Apr. 5, 2019, pp. 411-416, vol. 452, Elsevier, Amsterdam, NL.

* cited by examiner

OPTICAL SYSTEMS WITH MODULATED SURFACE RELIEF GRATINGS

This application is a continuation of International Patent Application No. PCT/US2022/027678, filed May 4, 2022, which claims priority to U.S. Provisional Patent Application No. 63/185,198, filed May 6, 2021, which are hereby incorporated by reference herein in their entireties.

BACKGROUND

This disclosure relates generally to optical systems and, more particularly, to optical systems for electronic devices with displays.

Electronic devices often include displays that present images close to a user's eyes. For example, virtual and augmented reality headsets may include displays with optical elements that allow users to view the displays.

Devices such as these can be challenging to design. If care is not taken, the components used to display images in these devices can be unsightly and bulky and may not exhibit a desired optical performance.

SUMMARY

An electronic device may have a display system. The display system may include a waveguide, an input coupler, and a surface relief grating (SRG) structure. The input coupler may couple image light into the waveguide. The image light may propagate down the waveguide via total internal reflection. The SRG structure may perform a cross-coupling operation in which the SRG structure expands the image light in a direction perpendicular to the direction of propagation. The SRG structure may also perform an output coupling operation in which the SRG structure couples the expanded image light out of the waveguide and towards an eye box. The SRG structure may be modulated across its lateral area to maximize the optical efficiency of the system.

For example, the SRG structure may include at least a first SRG and a second SRG. The second SRG may at least partially overlap the first SRG in one or more layers of SRG substrate. The first SRG may expand the image light in a first direction. The second SRG may expand the image light in a second direction opposite the first direction. The first SRG may couple the image light expanded by the second SRG out of the waveguide. The second SRG may couple the image light expanded by the first SRG out of the waveguide. The first SRG may have a grating strength that decreases from a brow region to a cheek region of the SRG structure. The second SRG may have a grating strength that decreases from the cheek region to the brow region. The first and second SRGs may exhibit the same grating strength in a region between the brow and cheek regions. Any desired modulation functions may be used to modulate the grating strengths of the SRGs in the SRG structure. If desired, the diffraction efficiency of the SRG structure may additionally or alternatively be varied between a nasal region and a temple region of the SRG structure.

DETAILED DESCRIPTION

Figure 1:
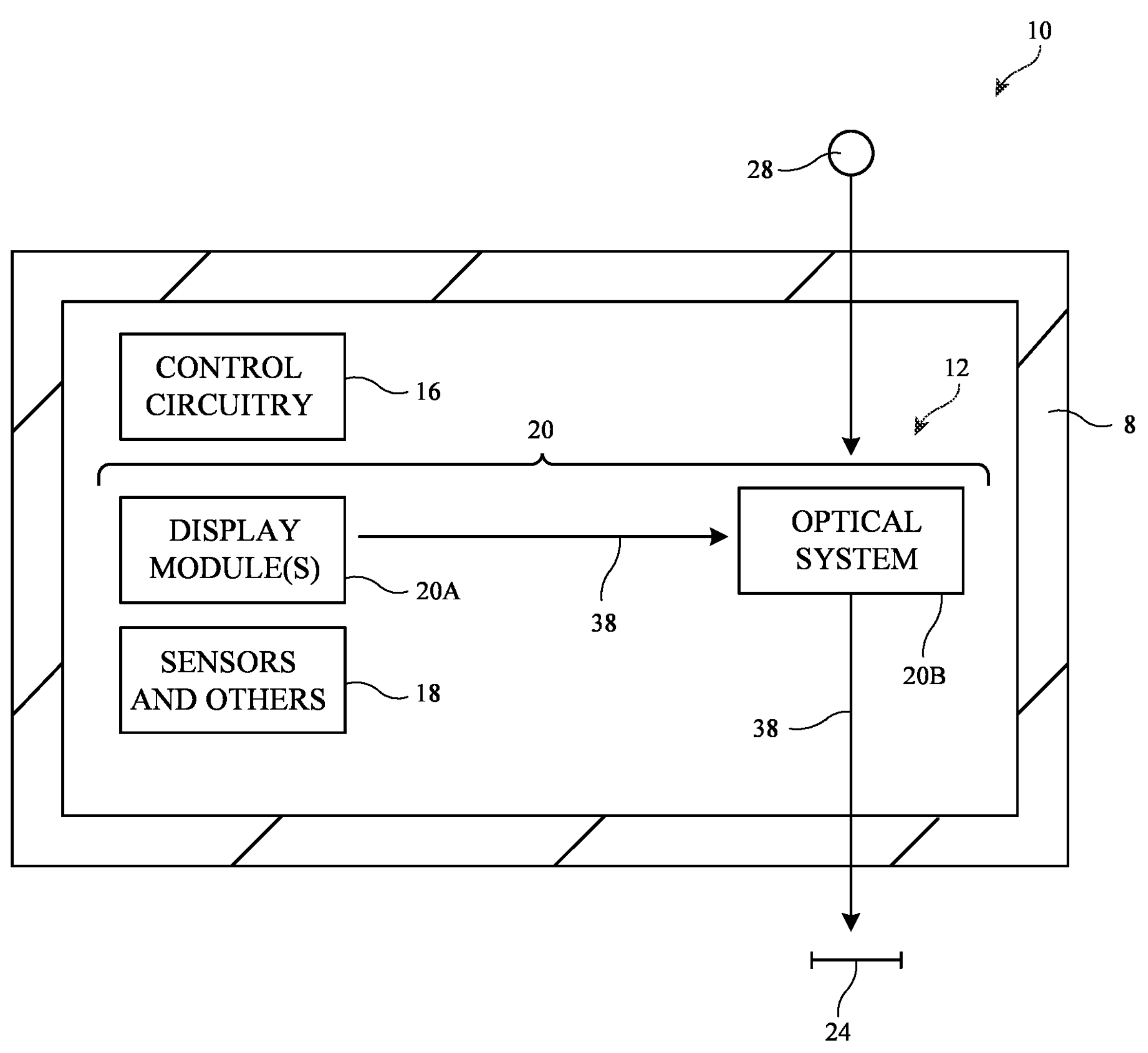
FIG. 1 is a diagram of an illustrative system having a display in accordance with some embodiments.

System 10 of FIG. 1 may be a head-mounted device having one or more displays. The displays in system 10 may include near-eye displays 20 mounted within support structure (housing) 8. Support structure 8 may have the shape of a pair of eyeglasses or goggles (e.g., supporting frames), may form a housing having a helmet shape, or may have other configurations to help in mounting and securing the components of near-eye displays 20 on the head or near the eye of a user. Near-eye displays 20 may include one or more display modules such as display modules 20A and one or more optical systems such as optical systems 20B. Display modules 20A may be mounted in a support structure such as support structure 8. Each display module 20A may emit light 38 (image light) that is redirected towards a user's eyes at eye box 24 using an associated one of optical systems 20B.

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code may be stored on storage in circuitry 16 and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.).

Display modules 20A may be liquid crystal displays, organic light-emitting diode displays, laser-based displays, or displays of other types. Optical systems 20B may form lenses that allow a viewer (see, e.g., a viewer's eyes at eye box 24) to view images on display(s) 20. There may be two optical systems 20B (e.g., for forming left and right lenses) associated with respective left and right eyes of the user. A single display 20 may produce images for both eyes or a pair of displays 20 may be used to display images. In configurations with multiple displays (e.g., left and right eye displays), the focal length and positions of the lenses formed by system 20B may be selected so that any gap present between the displays will not be visible to a user (e.g., so that the images of the left and right displays overlap or merge seamlessly).

If desired, optical system 20B may contain components (e.g., an optical combiner, etc.) to allow real-world image light from real-world images or objects 28 to be combined optically with virtual (computer-generated) images such as virtual images in image light 38. In this type of system, which is sometimes referred to as an augmented reality system, a user of system 10 may view both real-world content and computer-generated content that is overlaid on top of the real-world content. Camera-based augmented reality systems may also be used in device 10 (e.g., in an arrangement in which a camera captures real-world images of object 28 and this content is digitally merged with virtual content at optical system 20B).

System 10 may, if desired, include wireless circuitry and/or other circuitry to support communications with a computer or other external equipment (e.g., a computer that supplies display 20 with image content). During operation, control circuitry 16 may supply image content to display 20. The content may be remotely received (e.g., from a computer or other content source coupled to system 10) and/or may be generated by control circuitry 16 (e.g., text, other computer-generated content, etc.). The content that is supplied to display 20 by control circuitry 16 may be viewed by a viewer at eye box 24.

Figure 2:
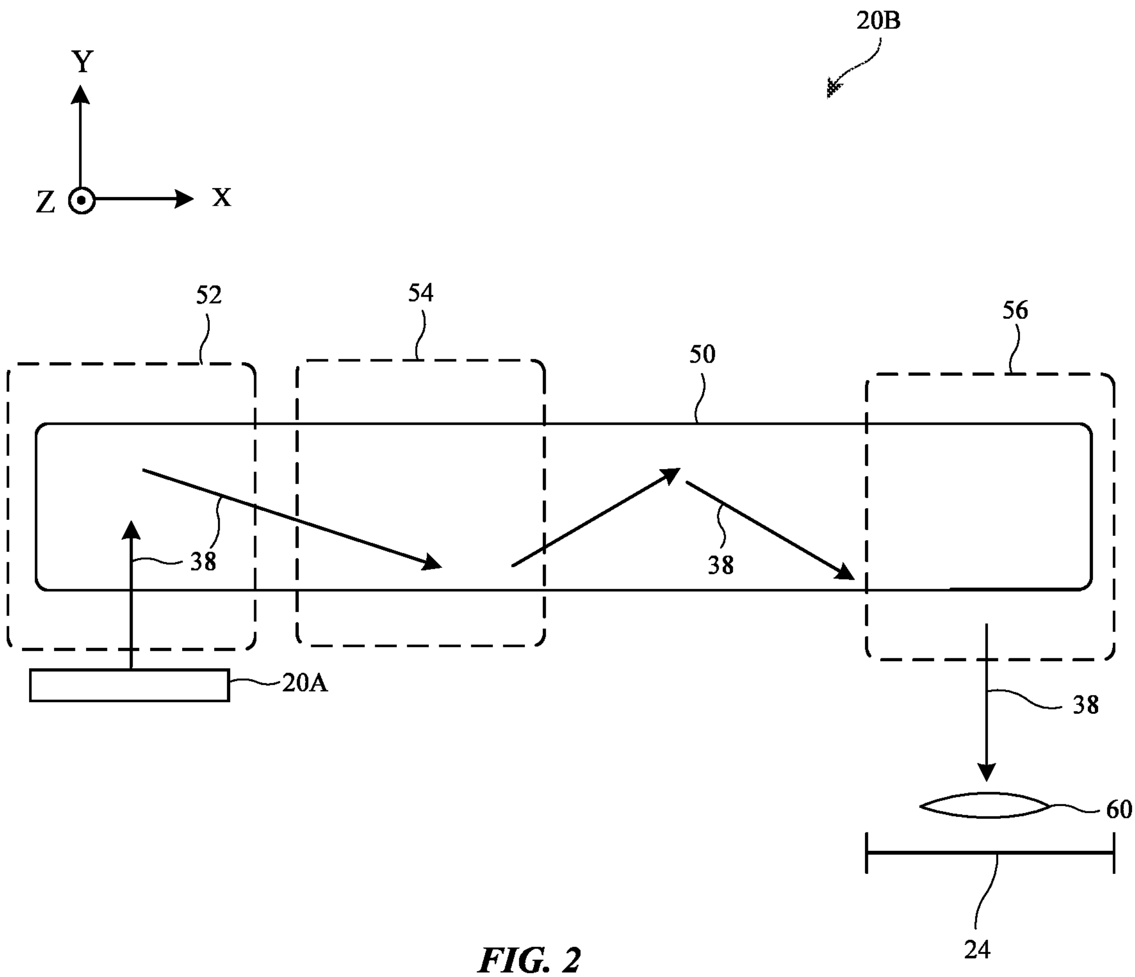
FIG. 2 is a top view of an illustrative optical system for a display having a waveguide with optical couplers in accordance with some embodiments.

FIG. 2 is a top view of an illustrative display 20 that may be used in system 10 of FIG. 1. As shown in FIG. 2, near-eye display 20 may include one or more display modules such as display module(s) 20A and an optical system such as optical system 20B. Optical system 20B may include optical elements such as one or more waveguides 50. Waveguide 50 may include one or more stacked substrates (e.g., stacked planar and/or curved layers sometimes referred to herein as waveguide substrates) of optically transparent material such as plastic, polymer, glass, etc.

If desired, waveguide 50 may also include one or more layers of holographic recording media (sometimes referred to herein as holographic media, grating media, or diffraction grating media) on which one or more diffractive gratings are recorded (e.g., holographic phase gratings, sometimes referred to herein as holograms). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating media may include photopolymers, gelatin such as dichromated gelatin, silver halides, holographic polymer dispersed liquid crystal, or other suitable holographic media.

Diffractive gratings on waveguide 50 may include holographic phase gratings such as volume holograms or thin-film holograms, meta-gratings, or any other desired diffractive grating structures. The diffractive gratings on waveguide 50 may also include surface relief gratings formed on one or more surfaces of the substrates in waveguides 26, gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles). Other light redirecting elements such as louvered mirrors may be used in place of diffractive gratings in waveguide 50 if desired.

As shown in FIG. 2, display module 20A may generate image light 38 associated with image content to be displayed to eye box 24. Image light 38 may be collimated using a collimating lens if desired. Image light 38 may be, for example, light that contains and/or represents something viewable such as a scene or object (e.g., as modulated onto the image light using the image data provided by the control circuitry to the display module). Optical system 20B may be used to present image light 38 output from display module 20A to eye box 24. If desired, display module 20A may be mounted within support structure 8 of FIG. 1 while optical system 20B may be mounted between portions of support structure 8 (e.g., to form a lens that aligns with eye box 24). Other mounting arrangements may be used, if desired.

Optical system 20B may include one or more optical couplers (e.g., light redirecting elements) such as input coupler 52, cross-coupler 54, and output coupler 56. In the example of FIG. 2, input coupler 52, cross-coupler 54, and output coupler 56 are formed at or on waveguide 50. Input coupler 52, cross-coupler 54, and/or output coupler 56 may be completely embedded within the substrate layers of waveguide 50, may be partially embedded within the substrate layers of waveguide 50, may be mounted to waveguide 50 (e.g., mounted to an exterior surface of waveguide 50), etc.

Waveguide 50 may guide image light 38 down its length via total internal reflection. Input coupler 52 may be configured to couple image light 38 from display module 20A into waveguide 50, whereas output coupler 56 may be configured to couple image light 38 from within waveguide 50 to the exterior of waveguide 50 and towards eye box 24. Input coupler 52 may include an input coupling prism, an edge or face of waveguide 50, a lens, a steering mirror or liquid crystal steering element, or any other desired input coupling elements. As an example, display module 20A may emit image light 38 in direction +Y towards optical system 20B. When image light 48 strikes input coupler 52, input coupler 52 may redirect image light 38 so that the light propagates within waveguide 50 via total internal reflection towards output coupler 56 (e.g., in direction +X within the total internal reflection (TIR) range of waveguide 50). When image light 38 strikes output coupler 56, output coupler 56 may redirect image light 38 out of waveguide 50 towards eye box 24 (e.g., back along the Y-axis). A lens such as lens 60 may help to direct or focus image light 38 onto eye box 24. Lens 60 may be omitted if desired. In scenarios where cross-coupler 54 is formed on waveguide 50, cross-coupler 54 may redirect image light 38 in one or more directions as it propagates down the length of waveguide 50, for example. In redirecting image light 38, cross-coupler 54 may also perform pupil expansion on image light 38.

Input coupler 52, cross-coupler 54, and/or output coupler 56 may be based on reflective and refractive optics or may be based on diffractive (e.g., holographic) optics. In arrangements where couplers 52, 54, and 56 are formed from reflective and refractive optics, couplers 52, 54, and 56 may include one or more reflectors (e.g., an array of micromirrors, partial mirrors, louvered mirrors, or other reflectors). In arrangements where couplers 52, 54, and 56 are based on diffractive optics, couplers 52, 54, and 56 may include diffractive gratings (e.g., volume holograms, surface relief gratings, etc.).

The example of FIG. 2 is merely illustrative. Optical system 14B may include multiple waveguides that are laterally and/or vertically stacked with respect to each other. Each waveguide may include one, two, all, or none of couplers 52, 54, and 56. Waveguide 50 may be at least partially curved or bent if desired. One or more of couplers 52, 54, and 56 may be omitted. If desired, optical system 20B may include an optical coupler such as a surface relief grating structure that performs the operations of both cross-coupler 54 and output coupler 56. For example, the surface relief grating structure may redirect image light 38 as the image propagates down waveguide 50 (e.g., while expanding the image light) and the surface relief grating structure may also couple image light 38 out of waveguide 50 and towards eye box 24.

Figures 3A, 3B, 3C:
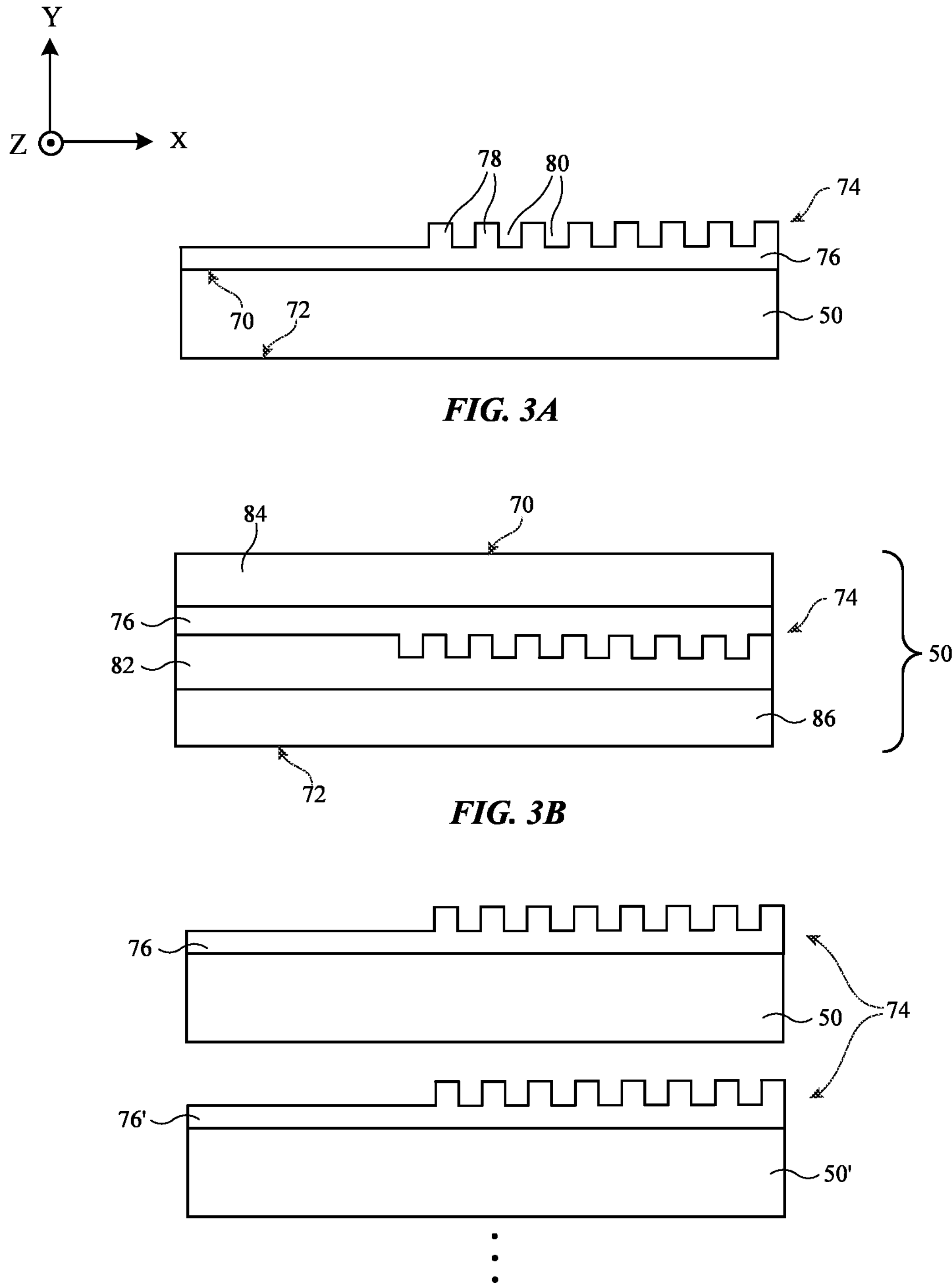
FIGS. 3A-3C are top views of illustrative a waveguide provided with a surface relief grating structure in accordance with some embodiments.

FIG. 3A is a top view showing one example of how a surface relief grating structure may be formed on waveguide 50. As shown in FIG. 3A, waveguide 50 may have a first lateral (e.g., exterior) surface 70 and a second lateral surface 72 opposite lateral surface 70. Waveguide 50 may include any desired number of one or more stacked waveguide substrates. If desired, waveguide 50 may also include a layer of grating medium sandwiched (interposed) between first and second waveguide substrates (e.g., where the first waveguide substrate includes lateral surface 70 and the second waveguide substrate includes lateral surface 72).

Waveguide 50 may be provided with a surface relief grating structure such as surface relief grating structure 74. Surface relief grating (SRG) structure 74 may be formed within a substrate such as a layer of SRG substrate (medium) 76. In the example of FIG. 3A, SRG substrate 76 is layered onto lateral surface 70 of waveguide 50. This is merely illustrative and, if desired, SRG substrate 76 may be layered onto lateral surface 72 (e.g., the surface of waveguide 50 that faces the eye box).

SRG structure 74 may include at least two partially-overlapping surface relief gratings. Each surface relief grating in SRG structure 74 may be defined by corresponding ridges (peaks) 78 and troughs (minima) 80 in the thickness of SRG substrate 76. In the example of FIG. 3A, SRG structure 74 is illustrated for the sake of clarity as a binary structure in which the surface relief gratings in SRG structure 74 are defined either by a first thickness associated with peaks 78 or a second thickness associated with troughs 80. This is merely illustrative. If desired, SRG structure 74 may be non-binary (e.g., may include any desired number of thicknesses following any desired profile, may include peaks 78 that are angled at non-parallel fringe angles with respect to the Y axis, etc.). If desired, SRG substrate 76 may be adhered to lateral surface 70 of waveguide 50 using a layer of adhesive (not shown). SRG structure 74 may be fabricated separately from waveguide 50 and may be adhered to waveguide 50 after fabrication, for example.

The example of FIG. 3A is merely illustrative. In another implementation, SRG structure 74 may be placed at a location within the interior of waveguide 50, as shown in the example of FIG. 3B. As shown in FIG. 3B, waveguide 50 may include a first waveguide substrate 84, a second waveguide substrate 86, and a media layer 82 interposed between waveguide substrate 84 and waveguide substrate 86. Media layer 82 may be a grating or holographic recording medium, a layer of adhesive, a polymer layer, a layer of waveguide substrate, or any other desired layer within waveguide 50. SRG substrate 76 may be layered onto the surface of waveguide substrate 84 that faces waveguide substrate 86. Alternatively, SRG substrate 76 may be layered onto the surface of waveguide substrate 86 that faces waveguide substrate 84.

If desired, SRG structure 74 may be distributed across multiple layers of SRG substrate, as shown in the example of FIG. 3C. As shown in FIG. 3C, the optical system may include multiple stacked waveguides such as at least a first waveguide 50 and a second waveguide 50'. A first SRG substrate 76 may be layered onto one of the lateral surfaces of waveguide 50 whereas a second SRG substrate 76' is layered onto one of the lateral surfaces of waveguide 50'. First SRG substrate 76 may include one or more of the surface relief gratings in SRG structure 74. Second SRG substrate 76' may include one or more of the surface relief gratings in SRG structure 74. This example is merely illustrative. If desired, the optical system may include more than two stacked waveguides. In examples where the optical system includes more than two waveguides, each waveguide that is provided with an SRG substrate may include one or more of the surface relief gratings in SRG structure 74. While described herein as separate waveguides, waveguides 50 and 50' of FIG. 3C may also be formed from respective waveguide substrates of the same waveguide, if desired. The arrangements in FIGS. 3A, 3B, and/or 3C may be combined if desired.

In practice, it is desirable for the output coupler on waveguide 50 to fill as large of an eye box 24 with as uniform-intensity image light 38 as possible. SRG structure 74 may perform the functionality of both a cross-coupler and an output coupler for waveguide 50. SRG structure 74 may therefore be configured to expand image light 38 in one or more dimensions while also coupling image light 38 out of waveguide 50. By using SRG structure 74 as both a cross-coupler and an output coupler, space may be conserved within the display (e.g., space that would otherwise be occupied by separate cross-coupler and output couplers). Space within the display may be more efficiently utilized by co-locating multiple surface relief gratings for redirecting (expanding) image light 38 in different directions (e.g., in an overlapping or interleaved arrangement in or on waveguide 50). The surface relief gratings in SRG structure 74 may overlap in physical space (e.g., when viewed in the −Y direction of FIGS. 3A-3C) and, in implementations where only a single SRG substrate 76 is used, may each at least partially overlap within the same volume of SRG substrate 76. Despite overlapping on waveguide 50, the surface relief gratings in SRG structure 74 diffract incoming light from and/or onto different respective directions.

Figure 4:
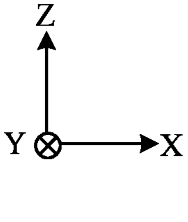
FIG. 4 is a front view of an illustrative surface relief grating structure having multiple surface relief gratings for performing light expansion and output coupling in accordance with some embodiments.
Figure 4:
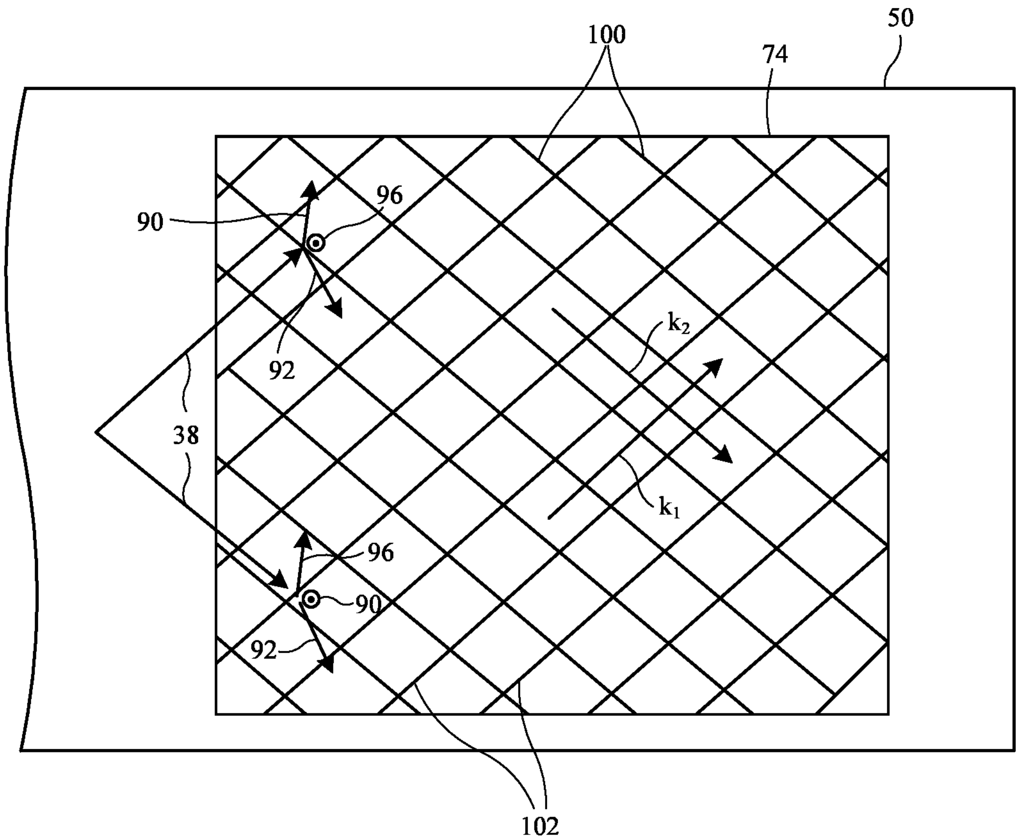

FIG. 4 is a front view of SRG structure 74 on waveguide 50. As shown in FIG. 4, SRG structure 74 may include at least a first surface relief grating (SRG) 100 and a second SRG 102. This is merely illustrative and, if desired, SRG structure 74 may include more than two SRGs. Each SRG in SRG structure 74 may include a respective set of peaks 78 and troughs 80 in the SRG substrate (e.g., at respective orientations). Each SRG in SRG structure 74 may be characterized by a respective grating vector k. Each SRG (e.g., SRG 100, SRG 102, etc.) may therefore sometimes be referred to herein simply as a grating or as a grating vector (e.g., SRG structure 74 may include two or more SRGs, gratings, or grating vectors).

The grating vector k for each SRG in SRG structure 74 is oriented perpendicular to the direction of the peaks 78 and troughs 80 in the SRG. The direction of grating vector k will therefore also describe the direction of the peaks 78 and troughs 80 in the SRG. The magnitude of grating vector k corresponds to the widths and spacings (e.g., the period) of the peaks 78 and troughs 80 in the SRG, as well as to the wavelengths of light diffracted by the SRG. Surface relief gratings often have a relatively wide bandwidth. The bandwidth of each SRG in SRG structure 74 may encompass each of the wavelengths in image light 38, for example (e.g., the entire visible spectrum, a portion of the visible spectrum, portions of the infrared or near-infrared spectrum, some or all of the visible spectrum and a portion of the infrared or near-infrared spectrum, etc.).

In the example of FIG. 4, SRG 100 is characterized by a corresponding grating vector $k_1$. Grating vector $k_1$ has a first orientation perpendicular to the direction of the peaks and troughs (fringes) in SRG 100 and has a corresponding magnitude. SRG 102 is characterized by a corresponding grating vector $k_2$. Grating vector $k_2$ has a second orientation that is different from the orientation of grating vector $k_1$ and has a corresponding magnitude. The magnitude of grating vector $k_2$ may be equal to the magnitude of grating vector $k_1$ or may be different from the magnitude of grating vector $k_1$. While illustrated within the plane of the page of FIG. 4 for the sake of clarity, grating vectors $k_1$ and $k_2$ may have non-zero vector components parallel to the Y-axis (e.g., grating vectors $k_1$ and $k_2$ may be tilted into or out of the page). SRG 102 at least partially overlaps SRG 104 (e.g., at least some of the peaks and troughs of each SRG spatially overlap or are superimposed within the same volume of SRG substrate).

Image light 38 may be conveyed to SRG structure 74 through waveguide 50 (e.g., via total internal reflection). First SRG 100 may be configured to diffract image light 38 about a first axis (e.g., a first reflective axis in a reflective mode) whereas second SRG 102 is configured to diffract image light 38 about a second axis (e.g., a second reflective axis) that is different from the first axis. SRGs 100 and 102 may be configured to perform dual functions (e.g., diffraction operations) on image light 38. For example, each SRG may be configured to redirect image light 38 both in a vertical direction (parallel to the Z-axis) and may be configured to redirect image light 38 out of waveguide 50 (e.g., parallel to the Y-axis).

As shown in the example of FIG. 4, first SRG 100 may redirect (diffract) image light 38 traveling in the +Z and +X directions downwards (e.g., in the −Z direction) and outwards (e.g., in the −Y direction), as shown by arrows 92 and 96. At the same time, second SRG 102 may redirect (diffract) image light 38 traveling in the −Z and +X directions upwards (e.g., in the +Z direction) and outwards (e.g., in the −Y direction), as shown by arrows 90 and 96. The SRGs in SRG structure 74 perform their respective cross-coupler operations by redirecting the image light in the +Z or −Z direction (e.g., serving to +Z or −Z-expand the image light). The SRGs in SRG structure 74 perform their respective output coupler operations by redirecting the image light in the −Y direction. In other words, the image light 38 that has been +Z expanded by SRG 102 may be output-coupled by SRG 100 and the image light 38 that has been −Z expanded by SRG 100 may be output-coupled by SRG 102. In this way, each SRG may perform two different diffraction operations (e.g., four total diffraction operations such as +Z expansion, output coupling of +Z-expanded light, −Z expansion, and output coupling of −Z-expanded light), rather than requiring four separate gratings to respectively perform +Z expansion, output coupling of +Z-expanded light, −Z expansion, and output coupling of −Z-expanded light. This may serve to reduce the manufacturing cost and complexity of system 10, to reduce optical travel distance, to increase throughput, and to optimize space use without sacrificing field of view. In addition, this may serve to reduce the number of interactions with the light redirecting elements necessary for each of the light rays to reach the eye, thereby increasing efficiency of the display.

Figure 5:
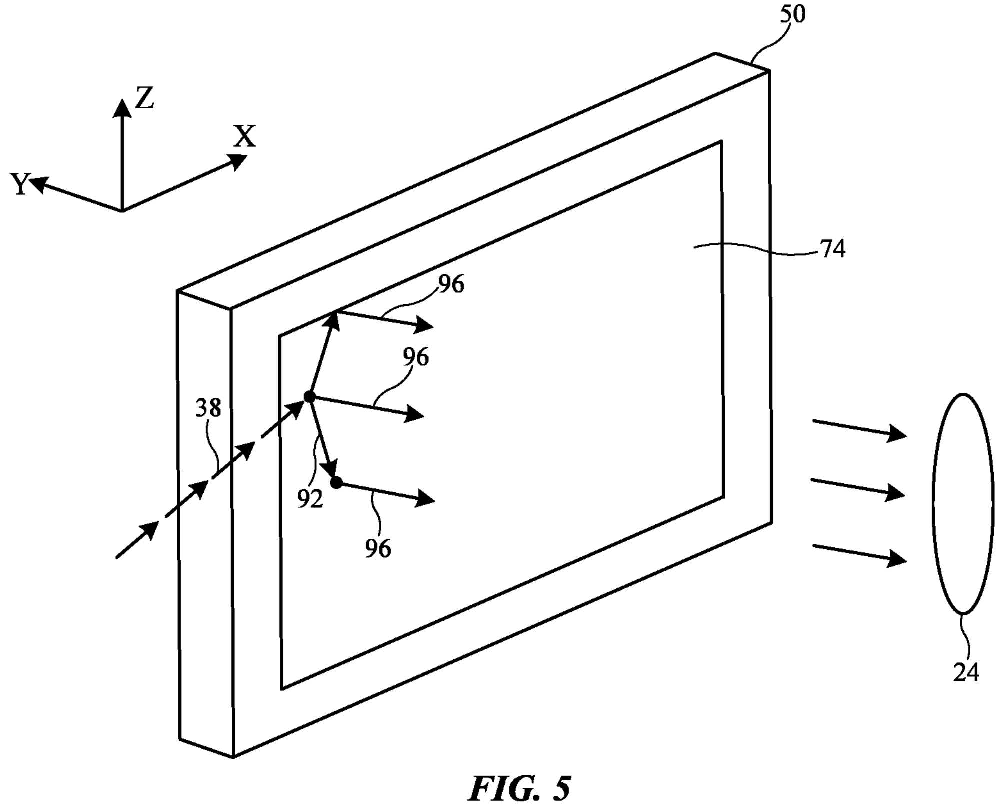
FIG. 5 is a perspective view of an illustrative surface relief grating structure having multiple surface relief gratings for performing light expansion and output coupling in accordance with some embodiments.

FIG. 5 is a perspective view of SRG structure 74. As shown in FIG. 5, SRG structure 74 may redirect image light 38 in the +Z direction (as shown by arrow 90) and the −Y direction (as shown by arrow 96) using SRG 102. At the same time, SRG structure 74 may redirect image light 38 in the −Z direction (as shown by arrow 92) and the −Y direction (as shown by arrow 96) using SRG 100. By performing light expansion operations in this way using SRG structure 74, a relatively large eye box 24 may be filled with uniform intensity image light for a relatively wide field of view. The examples of FIGS. 4 and 5 only show one or two light redirection operations performed by SRG structure 74 for the sake of clarity. In practice, these light redirections are performed throughout SRG structure 74 as image light 38 propagates down the length of SRG structure 74. Image light 38 may be continuously expanded in the +Z and −Z directions while propagating in the +X direction and being output coupled in the −Y direction In order to maximize the efficiency of the display, SRG structure 74 may be modulated across the lateral (spatial) area of SRG structure 74 (e.g., in the X-Z plane of FIGS. 4 and 5). SRG structure 74 may be modulated across its lateral area by adding (superimposing) additional SRGs at some portions of the lateral area of SRG structure 74 and/or by modulating the strength of each of the SRGs in SRG structure 74 (e.g., each of the grating vectors k) across the lateral area of SRG structure 74. The strength of each SRG may be modulated by varying the depth of the peaks and troughs of the SRG across the lateral area of SRG structure 74 and/or by defining a single SRG as a superposition of two SRG grating vectors (e.g., grating vectors $k_1$ and $k_2$) and then varying the relative weighting of each of the SRG grating vector in the superposition across the lateral area of SRG structure 74 (e.g., where the single SRG grating is represented by the expression $A*\cos(k_1)+B*\cos(k_2)$, where A is the relative weighting of grating vector $k_1$ and B is the relative weighting of grating vector $k_2$). This modulation may be performed upon fabrication of SRG structure 74. The strength of each SRG may sometimes be referred to herein as the grating strength of the SRG, the relative contribution of the SRG to the light diffraction performed by SRG structure 74, or the amount of diffraction performed by the SRG. Modulating the strength of the SRGs may sometimes also be referred to herein as modulating the contribution of each SRG, modulating the SRGs, modulating the amount of diffraction performed by the SRGs, or modulating the grating vectors k in SRG structure 74.

Figure 6:
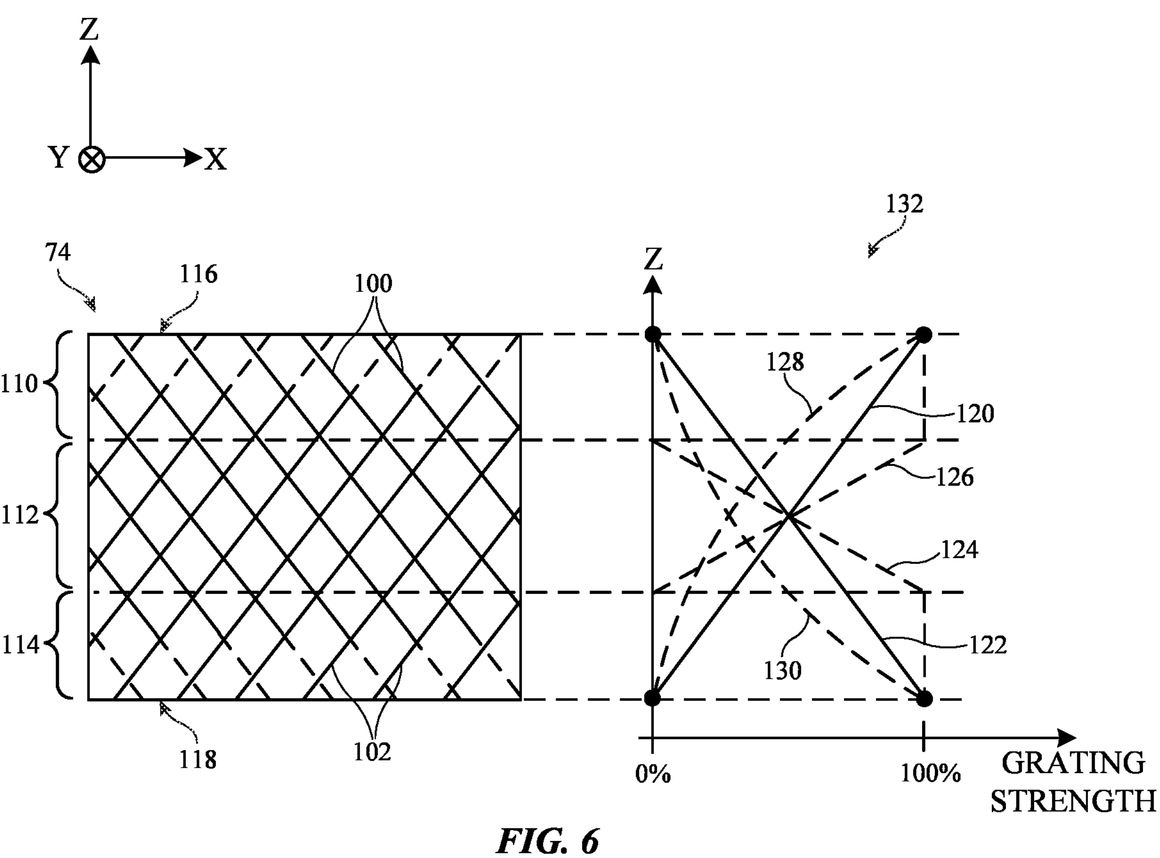
FIG. 6 is a front view of an illustrative surface relief grating structure having surface relief gratings that are modulated across its area in accordance with some embodiments.

FIG. 6 is a front view showing how the strength of SRGs 100 and 102 may be modulated across the lateral area of SRG structure 74. As shown in FIG. 6, SRG structure 74 may have an upper edge 116 and a lower edge 118. SRG structure 74 may have a central region 112, a first (upper) peripheral region 110 between central region 112 and upper edge 116, and a second (lower) peripheral region 114 between central region 112 and lower edge 118. Central region 112 may span any desired amount of the height of SRG structure 74 parallel to the Z-axis (e.g., 25%, 10%, 30%, 50%, more than 50%, less than 50%, more than 10%, more than 20%, more than 30%, more than 40%, less than 40%, less than 30%, less than 20%, etc.). Peripheral region 110 may sometimes be referred to herein as brow region 110 (e.g., because region 110 sits at or adjacent to the user's brow when the user is viewing the display). Peripheral region 114 may sometimes be referred to herein as cheek region 114 (e.g., because region 114 sits at or adjacent to the user's check when the user is viewing the display).

SRG 100 and SRG 102 may be modulated by varying the strength of the SRGs across the height of SRG structure 74 (parallel to the Z-axis). For example, SRG 100 may have relatively high strength within brow region 110, relatively low strength or no strength within cheek region 114, and intermediate or gradient strength within central region 112. Conversely, SRG 102 may have relatively high strength within cheek region 114, relatively low strength or no strength in brow region 110, and intermediate or gradient strength within central region 112. Configuring SRG 100 to be strongest in brow region 110 and configuring SRG 102 to be strongest in cheek region 114 may serve to maximize the overall efficiency of the display because most of the image light to be expanded in the −Z direction by SRG 100 will be incident upon the upper half of SRG structure 74 and most of the image light to be expanded in the +Z direction by SRG 102 will be incident upon the lower half of SRG structure 74

Graph 132 of FIG. 6 plots grating strength as a function of position along the height of SRG structure 74 (e.g., positions Z along the Z-axis). As one example, SRG 100 may be modulated such that the SRG exhibits a strength characterized by curve 120 whereas SRG 102 is modulated such that the SRG exhibits a strength characterized by curve 122 of graph 132. In this example, as shown by curve 120, SRG 100 exhibits a maximum (e.g., 100%) strength at edge 116, a minimum (e.g., 0%) strength at edge 118, and a linear gradient strength from edge 116 to edge 118. Similarly, as shown by curve 122, SRG 102 exhibits a maximum (e.g., 100%) strength at edge 118, a minimum (e.g., 0%) strength at edge 116, and a linear gradient strength from edge 118 to edge 116. This example is merely illustrative.

Curves 120 and 122 need not be linear and may, if desired, be continuously curved between edges 116 and 118, as shown by exemplary curves 128 and 130 respectively. As another example, SRG 100 may be modulated such that the SRG exhibits a strength characterized by curve 126 and SRG 102 may be modulated such that the SRG exhibits a strength characterized by curve 124. In this example, SRG 100 exhibits maximum strength in brow region 110, minimum or no strength in cheek region 114, and a linear gradient strength within central region 112. Similarly, SRG 102 exhibits maximum strength in cheek region 114, minimum or no strength in brow region 110, and a linear gradient strength within central region 112. When modulated in this way, in physical space, SRG structure 74 may have a checkerboard pattern (e.g., a two-dimensional grating pattern) within central region 112 (e.g., from the intersection of similarly-strong SRGs 100 and 102), may have a substantially linear pattern (e.g., a one-dimensional grating pattern) within brow region 110 (e.g., from SRG 100), and may have a substantially linear pattern within cheek region 114 (e.g., from SRG 102).

The example of FIG. 6 is merely illustrative. Curves 124 and 126 may be curved within central region 112 if desired. Curve 124 may have a non-zero value in brow region 110 if desired. Curve 126 may have a non-zero value in cheek region 114 if desired. A zero-value of curve 124 within brow region 110 and a zero-value of curve 126 in cheek region 114 (e.g., reducing the area where SRGs 100 and 102 overlap) may, for example, help to mitigate rainbow artifacts in the image light. Curves 120-130 may have other shapes in practice. In general, the modulation of SRGs 100 and 102 may be characterized by any desired combination of the curves shown in graph 132, by any desired step functions (e.g., a step function having a maximum or minimum value in brow region 110, an intermediate value in central region 112, and a minimum or maximum value in cheek region 114, a step function having more than three steps, etc.), and/or by any other desired (modulation) functions of position Z. The optimal modulation functions for each SRG may, for example, be calculated by superimposing the Fourier spatial harmonics with relative magnitudes, then taking a contour map to obtain a two-dimensional grating outline. The two-dimensional grating outline may be blazed in three dimensions or coated in three dimensions. This may result in an eye piece with gratings that change shape continuously or in many steps across the eye piece. Modulating SRG structure 74 across its area in this way may serve to maximize the overall efficiency with which the display expands and out-couples image light 38.

Figure 7:
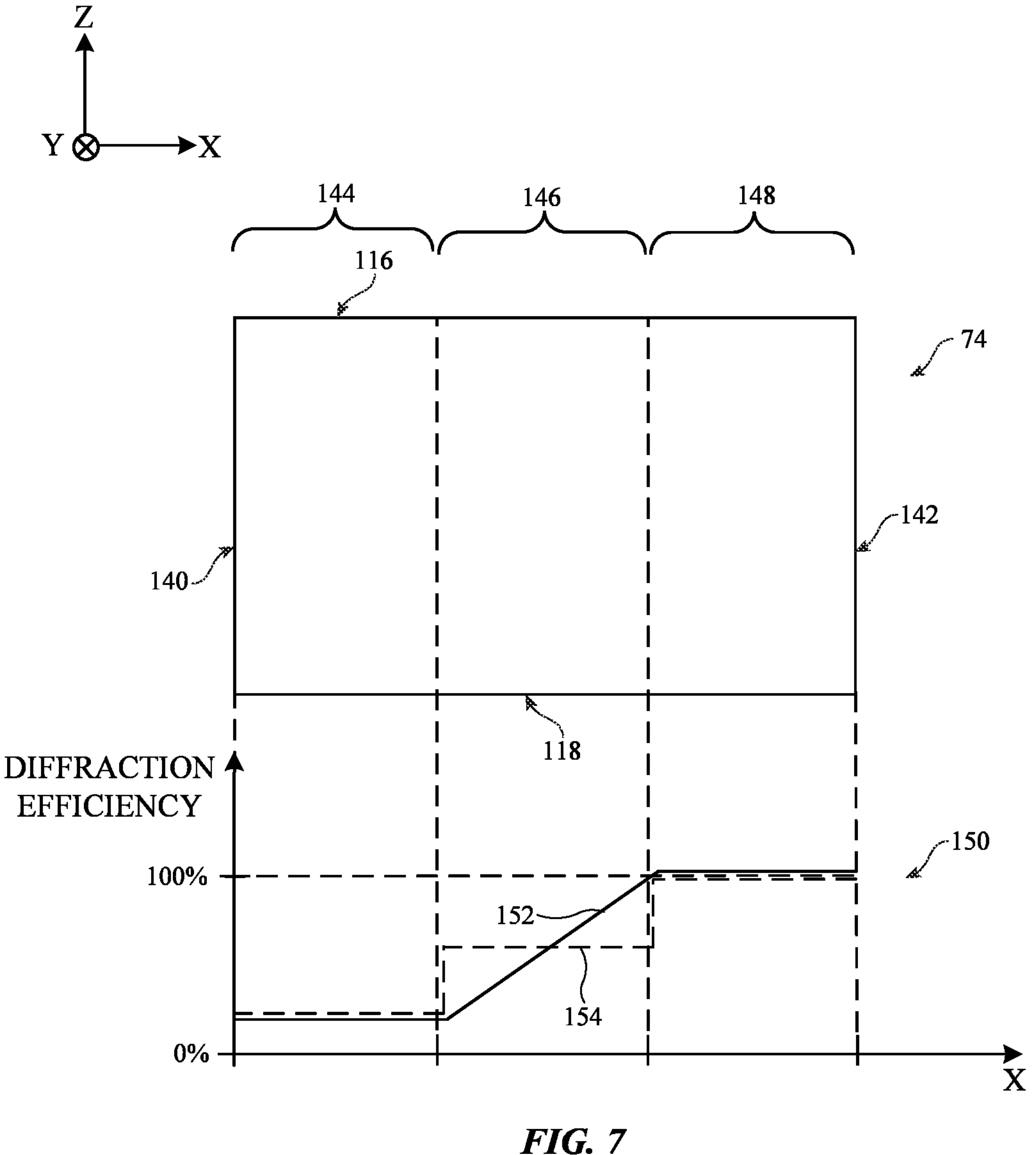
FIG. 7 is a front view showing one example of how the diffraction efficiency of an illustrative surface relief grating structure may be modulated across its area in accordance with some embodiments.

If desired, SRG structure 74 may also be modulated to provide SRG structure 74 with different diffraction efficiencies along its length. FIG. 7 is a front view showing how SRG structure 74 may be provided with different diffraction efficiencies along its length (dimension X). As shown in FIG. 7, SRG structure 74 may have a third (left) edge 140 and a fourth (right) edge 142 (e.g., where edges 116 and 118 extend from edge 140 to edge 142).

SRG structure 74 may have a central region 146, a first (left) peripheral region 144 between central region 146 and left edge 140, and a second (right) peripheral region 148 between central region 146 and right edge 142. Central region 146 may span any desired amount of the length of SRG structure 74 parallel to the X-axis (e.g., 25%, 10%, 30%, 50%, more than 50%, less than 50%, more than 10%, more than 20%, more than 30%, more than 40%, less than 40%, less than 30%, less than 20%, etc.). Peripheral region 144 may sometimes be referred to herein as nasal region 144

(e.g., because region 144 sits at or adjacent to the user's nose when the user is viewing the display). Peripheral region 148 may sometimes be referred to herein as temple region 148 (e.g., because region 148 sits at or adjacent to the user's temple when the user is viewing the display). This is merely illustrative and, in practice, region 144 may be a temple region and region 148 may be a nasal region (e.g., depending on the location of SRG structure 74 within the system).

In the example of FIG. 7, image light 38 is incident upon SRG structure 74 at left edge 140. This is merely illustrative and, in other implementations, image light 38 may be incident upon SRG structure 74 at right edge 142. Graph 150 of FIG. 7 plots diffraction efficiency as a function of position along the length of SRG structure 74 (e.g., positions X along the X-axis), in the example where image light 38 is incident upon SRG structure 74 at left edge 140. The SRGs in SRG structure 74 (e.g., SRG 100 and SRG 102) may each be modulated to configure SRG structure 74 to exhibit maximum diffraction efficiency within peripheral region 148 and minimum diffraction efficiency within peripheral region 144. This may serve to prevent SRG structure 74 from diffracting an excessive amount of image light 38 out of waveguide 50 before the image light has reached central region 146 and/or peripheral region 148, while also ensuring that any remaining image light 38 in peripheral region 148 is coupled out of the waveguide, thereby allowing the image light to fill eye box 24 with a brightness that is as uniform across the field of view of the eye box as possible.

As one example, SRG 100 and SRG 102 may each be modulated such that each SRG exhibits a diffraction efficiency characterized by curve 152 of graph 150. In this example, as shown by curve 152, SRG 100 and SRG 102 exhibit maximum (e.g., 100%) diffraction efficiency within peripheral region 148, minimum (e.g., 0%) diffraction efficiency within peripheral region 144, and a linear gradient diffraction efficiency within central region 146 from peripheral region 148 to peripheral region 144. While the maximum diffraction efficiency is sometimes referred to herein as 100% diffraction efficiency, this percentage is a relative value measured with respect to the overall peak diffraction efficiency of the SRG (e.g., the overall maximum diffraction efficiency each SRG may be less than 100% diffraction efficiency in practice).

As another example, SRG 100 and SRG 102 may each be modulated such that each SRG exhibits a diffraction efficiency characterized by a step function, as shown by curve 154 (e.g., with a single intermediate diffraction efficiency within central region 146. These examples are merely illustrative. Some or all of curve 154 may be curved rather than linear. Some or all of curve 152 may be curved rather than linear. Curve 154 may have any desired number of steps. In general, any desired modulation function may be used across the length of SRG structure 74 (e.g., a continuously curved modulation function from left edge 140 to right edge 142, a linear gradient function from left edge 140 to right edge 142, combinations of two or more of these arrangements, etc.).

The diffraction efficiency of SRG structure 74 may be modulated in this way by varying the geometry of the peaks and troughs used to form each of the SRGs and/or by increasing the number of grating vectors in SRG structure 74 along the X-axis, as examples. SRG structure 74 may be modulated along the X-axis as shown in FIG. 7, may be modulated along the Z-axis as shown in FIG. 6, or may be modulated along both the X-axis and the Y-axis (e.g., the arrangements of FIGS. 6 and 7 may be combined). For example, SRG 100 may be modulated such that the strength of SRG 100 decreases along the Z-axis at points moving away from upper edge 116 (as shown in FIG. 6), SRG 102 may be modulated such that the strength of SRG 102 decreases along the Z-axis at points moving away from lower edge 118 (as shown in FIG. 6), and SRG 100 and SRG2 may both be modulated (or additional SRG gratings may be added) such that the diffraction efficiency of SRG structure 74 increases along the X-axis at points moving away from left edge 140 (as shown in FIG. 7).

The examples of FIGS. 6 and 7 are merely illustrative. The strength of each SRG and the overall diffraction efficiency of SRG structure 74 may be varied in any desired direction(s). The modulation need not be strictly directional (e.g., SRG structure 74 may be modulated by increasing or decreasing SRG strength and/or diffraction efficiency within one or more regions of the lateral area of SRG structure 74 without increasing or decreasing SRG strength or diffraction efficiency in other regions of the lateral area of SRG structure 74). SRG structure 74 may have any desired lateral shape (e.g., SRG structure 74 may have three lateral edges or more than four lateral edges that follow any desired straight or curved paths). Edges 116, 118, 140, and/or 142 may follow any desired curved and/or straight paths extending at any desired angles with respect to each other (e.g., SRG structure 74 may have a rectangular lateral outline, a square lateral outline, a non-rectangular lateral outline, or may have any other desired lateral shape).

Figure 8:
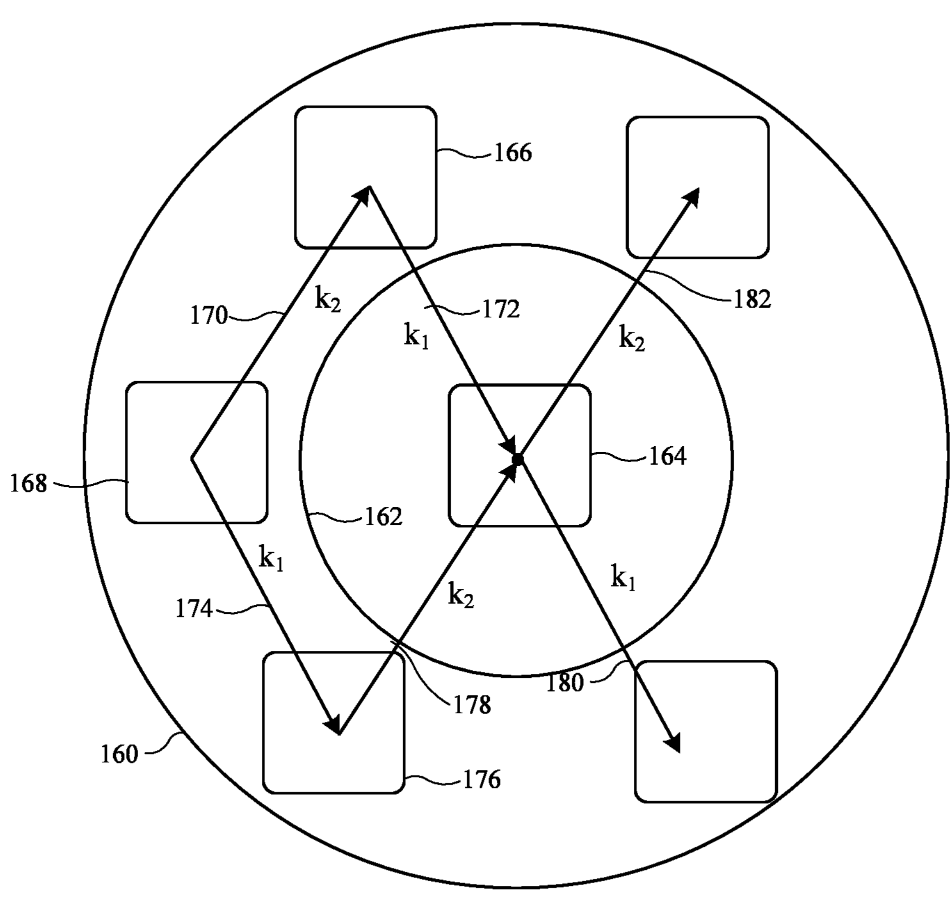
FIG. 8 is a k-space diagram illustrating the operation of a modulated surface relief grating structure in accordance with some embodiments.

FIG. 8 is a k-space (momentum space) diagram that illustrates one example of the diffraction operations performed by SRG structure 74 on image light 38. The k-space diagram in FIG. 8 is a two-dimensional cross section of a three-dimensional k-sphere that characterizes the operation of SRG structure 74 in three dimensions (e.g., one of the components of the k-sphere is omitted from FIG. 8 for the sake of clarity). Region 164 represents the field of view as provided at eye box 24. Region 168 represents the image light 38 that is coupled into waveguide 50 by input coupler 52 (FIG. 2) and that is incident upon SRG structure 74. The region between circles 162 and 160 represents the total internal reflection (TIR) range of waveguide 50 (e.g., when image light 38 lies between circles 162 and 160, the image light will propagate along waveguide 50 via TIR).

Arrow 170 schematically represents the first diffraction operation performed by SRG 102 on the image light 38 incident upon SRG structure 74. This first diffraction performs the cross-coupler function of SRG 102, helping to expand the image light (e.g., in the +Z direction as shown in FIG. 6). The length of arrow 170 corresponds to the magnitude of the grating vector $k_2$ associated with SRG 102 and the orientation of arrow 170 corresponds to the orientation of grating vector $k_2$. Region 166 represents the image light that has been expanded in the +Z direction by SRG 102 (e.g., as obtained from the vector addition of grating vector $k_2$ with points in region 168).

Arrow 174 schematically represents the first diffraction operation performed by SRG 100 on the image light 38 incident upon SRG structure 74. This first diffraction performs the cross-coupler function of SRG 100, helping to expand the image light (e.g., in the −Z direction as shown in FIG. 6). The length of arrow 174 corresponds to the magnitude of the grating vector $k_1$ associated with SRG 100 and the orientation of arrow 174 corresponds to the orientation of grating vector $k_1$. Region 176 represents the image light that has been expanded in the −Z direction by SRG 100 (e.g., as obtained from the vector addition of grating vector $k_1$ with points in region 168).

Arrow 172 schematically represents the second diffraction operation performed by SRG 100, on the image light 38 that has already been expanded in the +Z direction by SRG 102. This second diffraction performs the output coupler function of SRG 100, serving to couple the +Z-expanded image light out of waveguide 50 (e.g., in the −Y direction as shown in FIG. 6). The length of arrow 172 corresponds to the magnitude of the grating vector $k_1$ associated with SRG 100 and the orientation of arrow 172 corresponds to the orientation of grating vector $k_1$ (e.g., arrows 172 and 174 are parallel to each other and have the same length). This image light is coupled out of waveguide 50 and directed towards eye box 24 because the vector addition of grating vector $k_1$ with points in region 166 falls outside of the TIR range of waveguide 50 and within the field of view of eye box 24 (region 164).

Arrow 178 schematically represents the second diffraction operation performed by SRG 102, on the image light 38 that has already been expanded in the −Z direction by SRG 100. This second diffraction performs the output coupler function of SRG 102, serving to couple the −Z-expanded image light out of waveguide 50 (e.g., in the −Y direction as shown in FIG. 6). The length of arrow 178 corresponds to the magnitude of the grating vector $k_2$ associated with SRG 102 and the orientation of arrow 178 corresponds to the orientation of grating vector $k_2$ (e.g., arrows 170 and 178 are parallel to each other and have the same length). This image light is coupled out of waveguide 50 and directed towards eye box 24 because the vector addition of grating vector $k_2$ with points in region 176 falls outside of the TIR range of waveguide 50 and within the field of view of eye box 24 (region 164).

In practice, the cross-coupling function performed by SRGs 100 and 102 can introduce undesirable back reflection into SRG structure 74. The back-reflection occurs when image light 38 incident upon an SRG at a certain incident angle is reflected backwards by the SRG (e.g., at a 180-degree angle with respect to the incident angle) rather than being diffracted onto the desired output angle. If care is not taken, this back-reflected light can leak out the sides of the SRG structure, thereby limiting the maximum brightness achievable at eye box 24. In the example of FIG. 8, back-reflection by SRG 100 is illustrated by arrow 180 and back-reflection by SRG 102 is illustrated by arrow 182. If desired, SRG structure 74 may include an additional SRG (grating vector) to counteract the back-reflection associated with arrow 182 and may include an additional SRG (grating vector to counteract the back-reflection associated with arrow 180). These additional SRGs may help to keep the back-reflected image light within the lateral area of SRG structure 74, thereby providing more opportunity for the back-reflected light to be cross-coupled and output coupled by at least SRGs 100 and 102. This may serve to maximize the peak brightness achievable at eye box 24.

The examples shown in FIGS. 4-8 assume that the display module is located in the temple region of the support structure for system 10. This is merely illustrative and, in implementations where the display module is located in the nasal region of the support structure, the arrangement in FIGS. 4-6 may be reversed in orientation about the Z-axis. If desired, grating vector $k_1$ (SRG 100) and/or grating vector $k_2$ (SRG 102) may be omitted from certain areas or regions of SRG structure 74 (e.g., from around the periphery or perimeter of SRG structure 74). This may serve to help prevent rainbow flair cosmetic artifacts, for example. Additionally or alternatively, grating vector $k_1$ can be omitted from the cheek side of the SRG structure (and vice versa for grating vector $k_2$). This may serve to prevent ceiling lights from diffracting into the eye, for example. If desired, the overlapping grating vectors $k_1$ and $k_2$ on the nasal side can be configured to help prevent a pathway where two diffraction events can cause world light to scatter into the eye. However, this reduction in overlap should be made so as not to undesirably reduce uniformity and thus allowable eye box size.

Figure 9:
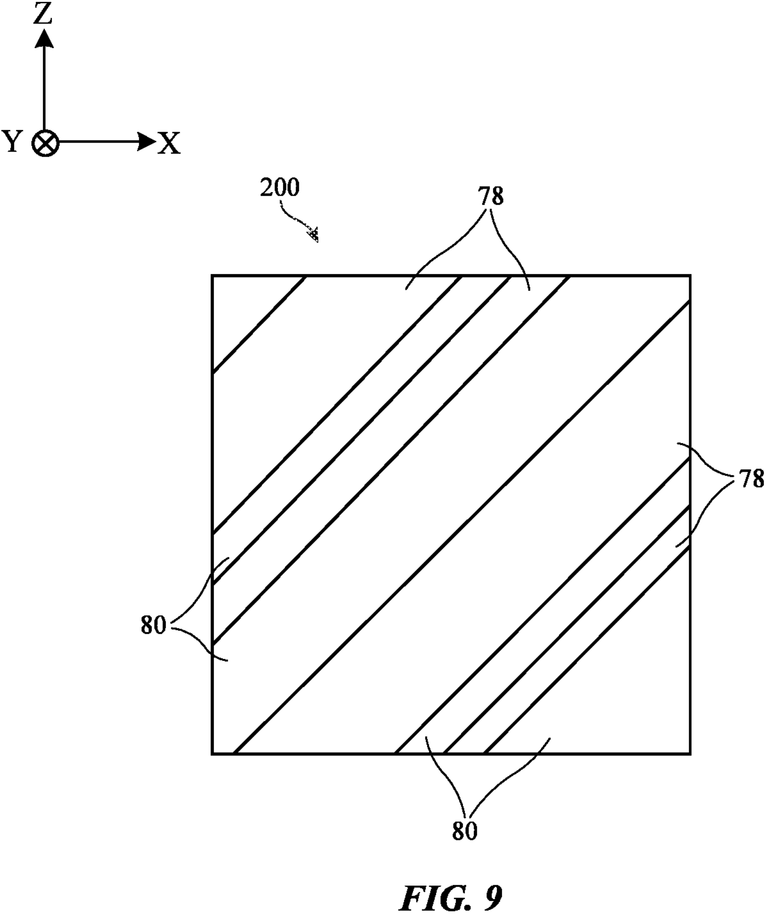
FIG. 9 is a front view showing one example of a groove pattern that may be formed within a region of a modulated surface relief grating structure in accordance with some embodiments.

FIG. 9 is a front view of a portion 200 of SRG structure 74 (in physical space). As shown in FIG. 9, portion 200 includes peaks 78 and troughs 80. The width, spacing, and orientation of peaks 78 and troughs 80 may be given by the one or more SRGs located within portion of SRG structure 74 (e.g., from a single SRG or the superposition of multiple SRGs). Because SRG structure 74 is modulated across its lateral area, the peaks and troughs of SRG structure 74 will have different widths, spacings, and/or orientations in physical space at other locations across the lateral area of SRG structure 74. If desired, the operations of SRG structure 74 as described herein may be performed using any desired type of diffractive grating structure on waveguide 50 (e.g., each SBG in SRG structure 74 may be replaced by one or more respective volume holograms, thin film holograms, meta gratings, or any other desired type of diffractive gratings that perform the operations of the SBGs as described herein). If desired, one or more of the SRGs in SRG structure 74 may be replaced with one or more volume holograms, thin film holograms, meta gratings, other types of diffractive gratings, louvered mirrors, or other reflective structures that perform the same operations as the replaced SRG(s). If desired, one or more of the SRGs in SRG structure 74 may be replaced with one or more volume holograms, thin film holograms, meta gratings, etc., that perform the same operations as the replaced SRG(s) while SRG structure 74 also includes SRGs that perform the functions described herein (e.g., in a hybrid coupler arrangement).

In accordance with an embodiment, a display system is provided that includes a waveguide configured to propagate image light in a first direction via total internal reflection; and a surface relief grating (SRG) structure at the waveguide, the SRG structure has a lateral area and includes a first SRG configured to diffract a first portion of the image light in a second direction that is different from the first direction, and a second SRG that at least partially overlaps the first SRG and that is configured to diffract a second portion of the image light in a third direction that is different from the first and second directions, the first SRG is configured to diffract the second portion of the image light that has been diffracted by the second SRG out of the waveguide, the second SRG is configured to diffract the first portion of the image light that has been diffracted by the first SRG out of the waveguide, and the first SRG has a grating strength that is modulated across the lateral area of the SRG structure.

In accordance with another embodiment, the second SRG has an additional grating strength that is modulated across the lateral area of the SRG structure.

In accordance with another embodiment, the SRG structure has a first edge and a second edge opposite the first edge, the grating strength of the first SRG has a first value at the first edge and a second value at the second edge, and the second value is less than the first value.

In accordance with another embodiment, the additional grating strength of the second SRG has a third value at the second edge and a fourth value at the first edge, the fourth value being less than the third value.

In accordance with another embodiment, the grating strength of the first SRG decreases in a linear gradient from the first edge to the second edge and the additional grating strength of the second SRG decreases in a linear gradient from the second edge to the first edge.

In accordance with another embodiment, the SRG structure has a third edge and a fourth edge opposite the third edge, the first SRG and the second SRG are configured to exhibit a first diffraction efficiency at the third edge, and the first SRG and the second SRG are configured to exhibit a second diffraction efficiency at the fourth edge, the second diffraction efficiency being greater than the first diffraction efficiency.

In accordance with another embodiment, the first and second edges of the SRG structure extend parallel to the first direction.

In accordance with another embodiment, the display system includes a SRG substrate layered on a lateral surface of the waveguide, the first SRG and the second SRG are formed in the SRG substrate.

In accordance with another embodiment, the SRG structure includes a third SRG that at least partially overlaps the first SRG and that is configured to mitigate back-reflection of the image light by the first SRG.

In accordance with an embodiment, a display system is provided that includes a waveguide configured to propagate image light via total internal reflection; and a surface relief grating (SRG) structure on the waveguide, the SRG structure has a first region, a second region, and a third region, the second region being laterally interposed between the first region and the third region, the SRG structure includes a first SRG configured to contribute a first amount of diffraction to the image light in the first region, a second amount of diffraction to the image light in the second region, and a third amount of diffraction to the image light in the third region, the second amount of diffraction being less than the first amount of diffraction and the third amount of diffraction being less than the second amount of diffraction, the SRG structure includes a second SRG that at least partially overlaps the first SRG, the second SRG being configured to contribute the third amount of diffraction to the image light in the first region, the second amount of diffraction to the image light in the second region, and the first amount of diffraction to the image light in the third region, and the SRG structure is configured to couple the image light out of the waveguide.

In accordance with another embodiment, the first SRG and the second SRG are each configured to expand the image light.

In accordance with another embodiment, the first SRG is configured to expand the image light in a first direction, the second SRG is configured to couple the image light expanded in the first direction by the first SRG out of the waveguide, the second SRG is configured to expand the image light in a second direction different from the first direction, and the first SRG is configured to couple the image light expanded in the second direction by the second SRG out of the waveguide.

In accordance with another embodiment, the display system includes an SRG substrate layered on the waveguide, the first SRG and the second SRG are formed in the SRG substrate.

In accordance with another embodiment, the waveguide includes a first waveguide substrate having a first lateral surface and a second waveguide substrate having a second lateral surface, the display system includes a first SRG substrate layered on the first lateral surface, the first SRG is formed in the first SRG substrate; and a second SRG substrate layered on the second lateral surface, the second SRG is formed in the second SRG substrate.

In accordance with another embodiment, the SRG structure includes a fourth region, a fifth region, and a sixth region, the fifth region is laterally interposed between the fourth region and the sixth region, the fourth, fifth, and sixth regions each overlap the first region, the second region, and the third region, and the first SRG and the second SRG are configured to exhibit a first diffraction efficiency in the fourth region, a second diffraction efficiency in the fifth region that is greater than the first diffraction efficiency, and a third diffraction efficiency in the sixth region that is greater than the second diffraction efficiency.

In accordance with another embodiment, the display system includes an input coupler configured to couple the image light into the waveguide, the fourth region of the SRG structure is optically interposed between the input coupler and the fifth region of the SRG structure.

In accordance with an embodiment, a head mounted display device is provided that includes a waveguide; an input coupler configured to couple image light into the waveguide; a surface relief grating (SRG) structure on the waveguide, the SRG structure is configured to expand the image light, the SRG structure is configured to couple the expanded image light out of the waveguide, the SRG structure has a brow region and a cheek region, and the SRG structure includes a first SRG having a first strength that decreases from the brow region to the cheek region, and a second SRG that at least partially overlaps the first SRG and that has a second strength that decreases from the cheek region to the brow region.

In accordance with another embodiment, the first SRG is configured to expand a first portion of the image light in a first direction, the second SRG is configured to expand a second portion of the image light in a second direction opposite the first direction, the first SRG is configured to couple the second portion of the image light expanded by the second SRG out of the waveguide, and the second SRG is configured to couple the first portion of the image light expanded by the first SRG out of the waveguide.

In accordance with another embodiment, the SRG structure has a nasal region and a temple region that is different from the nasal region, the nasal region overlaps the brow region and the cheek region, the temple region overlaps the brow region and the cheek region, the SRG structure is configured to receive the image light at the nasal region, the first SRG and the second SRG have a first diffraction efficiency in the nasal region, and the first SRG and the second SRG have a second diffraction efficiency that is greater than the first diffraction efficiency in the temple region.

In accordance with another embodiment, the SRG structure has a nasal region and a temple region that is different from the nasal region, the nasal region overlaps the brow region and the cheek region, the temple region overlaps the brow region and the cheek region, the SRG structure is configured to receive the image light at the temple region, the first SRG and the second SRG have a first diffraction efficiency in the nasal region, and the first SRG and the second SRG have a second diffraction efficiency that is less than the first diffraction efficiency in the temple region.

The foregoing is merely illustrative and various modifications can be made to the described embodiments. The foregoing embodiments may be implemented individually or in any combination.

What is claimed is:

1. A display system comprising:

a waveguide configured to propagate image light in a first direction via total internal reflection; and a surface relief grating (SRG) structure at the waveguide, wherein the SRG structure has a lateral area and comprises:

a first SRG configured to diffract a first portion of the image light in a second direction that is different from the first direction, and a second SRG that at least partially overlaps the first SRG and that is configured to diffract a second portion of the image light in a third direction that is different from the first and second directions, wherein the first SRG is configured to diffract the second portion of the image light that has been diffracted by the second SRG out of the waveguide, the second SRG is configured to diffract the first portion of the image light that has been diffracted by the first SRG out of the waveguide, and the first SRG has a grating strength that is modulated across the lateral area of the SRG structure.

2. The display system of claim 1, wherein the second SRG has an additional grating strength that is modulated across the lateral area of the SRG structure.

3. The display system of claim 2, wherein the SRG structure has a first edge and a second edge opposite the first edge, the grating strength of the first SRG has a first value at the first edge and a second value at the second edge, and the second value is less than the first value.

4. The display system of claim 3, wherein the additional grating strength of the second SRG has a third value at the second edge and a fourth value at the first edge, the fourth value being less than the third value.

5. The display system of claim 4, wherein the grating strength of the first SRG decreases in a linear gradient from the first edge to the second edge and wherein the additional grating strength of the second SRG decreases in a linear gradient from the second edge to the first edge.

6. The display system of claim 4, wherein the SRG structure has a third edge and a fourth edge opposite the third edge, the first SRG and the second SRG are configured to exhibit a first diffraction efficiency at the third edge, and the first SRG and the second SRG are configured to exhibit a second diffraction efficiency at the fourth edge, the second diffraction efficiency being greater than the first diffraction efficiency.

7. The display system of claim 6, wherein the first and second edges of the SRG structure extend parallel to the first direction.

8. The display system of claim 1, wherein:

the grating strength of the first SRG has a first value at a first edge of the SRG structure and a second value at a second edge of the SRG structure, the second value is less than the first value, a grating strength of the second SRG has a third value at the second edge and a fourth value at the first edge, and the fourth value is less than the third value.

9. The display system of claim 1, wherein the second SRG exhibits a diffraction efficiency that varies across the lateral area of the SRG structure.

10. A display system comprising:

a waveguide configured to propagate image light via total internal reflection; and a surface relief grating (SRG) structure on the waveguide, wherein:

the SRG structure has a first region, a second region, and a third region, the second region being laterally interposed between the first region and the third region, the SRG structure comprises a first SRG configured to contribute a first amount of diffraction to the image light in the first region, a second amount of diffraction to the image light in the second region, and a third amount of diffraction to the image light in the third region, the second amount of diffraction being less than the first amount of diffraction and the third amount of diffraction being less than the second amount of diffraction, the SRG structure comprises a second SRG that at least partially overlaps the first SRG, the second SRG being configured to contribute the third amount of diffraction to the image light in the first region, the second amount of diffraction to the image light in the second region, and the first amount of diffraction to the image light in the third region, and the SRG structure is configured to couple the image light out of the waveguide.

11. The display system of claim 10, wherein the first SRG and the second SRG are each configured to expand the image light.

12. The display system of claim 11, wherein the first SRG is configured to expand the image light in a first direction, the second SRG is configured to couple the image light expanded in the first direction by the first SRG out of the waveguide, the second SRG is configured to expand the image light in a second direction different from the first direction, and the first SRG is configured to couple the image light expanded in the second direction by the second SRG out of the waveguide.

13. The display system of claim 10, further comprising an SRG substrate layered on the waveguide, wherein the first SRG and the second SRG are formed in the SRG substrate.

14. The display system of claim 10, wherein the waveguide comprises a first waveguide substrate having a first lateral surface and a second waveguide substrate having a second lateral surface, the display system further comprising:

a first SRG substrate layered on the first lateral surface, wherein the first SRG is formed in the first SRG substrate; and a second SRG substrate layered on the second lateral surface, wherein the second SRG is formed in the second SRG substrate.

15. The display system of claim 10, wherein the SRG structure includes a fourth region, a fifth region, and a sixth region, wherein the fifth region is laterally interposed between the fourth region and the sixth region, wherein the fourth, fifth, and sixth regions each overlap the first region, the second region, and the third region, and wherein the first SRG and the second SRG are configured to exhibit a first diffraction efficiency in the fourth region, a second diffraction efficiency in the fifth region that is greater than the first diffraction efficiency, and a third diffraction efficiency in the sixth region that is greater than the second diffraction efficiency.

16. The display system of claim 15, further comprising:

an input coupler configured to couple the image light into the waveguide, wherein the fourth region of the SRG structure is optically interposed between the input coupler and the fifth region of the SRG structure.

17. A head mounted display device comprising:

a waveguide;

an input coupler configured to couple image light into the waveguide; and a surface relief grating (SRG) structure on the waveguide, wherein the SRG structure is configured to expand the image light, the SRG structure is configured to couple the expanded image light out of the waveguide, the SRG structure has a brow region and a cheek region, and the SRG structure comprises:

a first SRG having a first strength that decreases from the brow region to the cheek region, and a second SRG that at least partially overlaps the first SRG and that has a second strength that decreases from the cheek region to the brow region.

18. The head mounted display device of claim 17, wherein the first SRG is configured to expand a first portion of the image light in a first direction, the second SRG is configured to expand a second portion of the image light in a second direction opposite the first direction, the first SRG is configured to couple the second portion of the image light expanded by the second SRG out of the waveguide, and the second SRG is configured to couple the first portion of the image light expanded by the first SRG out of the waveguide.

19. The head mounted display device of claim 17, wherein the SRG structure has a nasal region and a temple region that is different from the nasal region, the nasal region overlaps the brow region and the cheek region, the temple region overlaps the brow region and the cheek region, the SRG structure is configured to receive the image light at the nasal region, the first SRG and the second SRG have a first diffraction efficiency in the nasal region, and the first SRG and the second SRG have a second diffraction efficiency that is greater than the first diffraction efficiency in the temple region.

20. The head mounted display device of claim 17, wherein the SRG structure has a nasal region and a temple region that is different from the nasal region, the nasal region overlaps the brow region and the cheek region, the temple region overlaps the brow region and the cheek region, the SRG structure is configured to receive the image light at the temple region, the first SRG and the second SRG have a first diffraction efficiency in the nasal region, and the first SRG and the second SRG have a second diffraction efficiency that is less than the first diffraction efficiency in the temple region.

* * * * *